United States Patent [19]  
Akagi et al.

[11] 4,344,874  
[45] Aug. 17, 1982

[54] POLYETHYLENE TEREPHTHALATE RESIN COMPOSITIONS

[75] Inventors: Noriyuki Akagi; Yoshinari Ogawa; Kouichi Sakai, all of Sagamihara, Japan

[73] Assignee: Teijin Limited, Osaka, Japan

[21] Appl. No.: 258,302

[22] Filed: Apr. 28, 1981

[30] Foreign Application Priority Data

Apr. 28, 1980 [JP] Japan .................................. 55/55482
Jun. 4, 1980 [JP] Japan .................................. 55/74189

[51] Int. Cl.$^3$ .............................................. C08K 5/12
[52] U.S. Cl. .................................... 524/296; 524/394; 524/396; 524/397; 524/400; 524/513; 524/605
[58] Field of Search ...... 260/31.2 XA, 22 A, 31.8 XA

[56] References Cited

U.S. PATENT DOCUMENTS

| | | | |
|---|---|---|---|
| 3,657,180 | 4/1972 | Cohn | 260/31.8 XA |
| 3,816,442 | 6/1974 | Mueller | 260/31.8 XA |
| 3,969,306 | 7/1976 | Borman et al. | 260/31.8 XA |
| 4,276,208 | 6/1981 | Ogawa et al. | 260/22 A |
| 4,284,540 | 8/1981 | Iida et al. | 260/31.2 XA |

FOREIGN PATENT DOCUMENTS 2015014 9/1979 United Kingdom .

*Primary Examiner*—Joseph L. Schofer  
*Assistant Examiner*—N. Sarofim  
*Attorney, Agent, or Firm*—Burgess, Ryan and Wayne

[57] ABSTRACT

A polyethylene terephthalate resin composition capable of providing a molded article of a high crystallinity and an excellent dimensional stability and thermal resistance consists essentially of a polyethylene terephthalate resin having an intrinsic viscosity of 0.35 to 0.9 and, per 100 parts by weight of the polyethylene terephthalate resin, 5 to 200 parts by weight of an inorganic filler, 0.01 to 20 parts by weight of dimethyl or diethyl terephthalate and 0.01 to 5 parts by weight of a salt of a carboxylic acid with a metal of Group I or II in the periodic table or 0.1 to 10 parts by weight of an ionic copolymer of an $\alpha$-olefin with a salt of an $\alpha,\beta$-unsaturated carboxylic acid and containing an ion of a metal of Group I or II in the periodic table.

14 Claims, No Drawings

POLYETHYLENE TEREPHTHALATE RESIN COMPOSITIONS

BACKGROUND OF THE INVENTION

1. Field of the Invention

The invention relates to a polyethylene terephthalate resin composition. More particularly, the invention relates to a polyethylene terephthalate resin composition of a high crystallinity and excellent in moldability and in dimensional stability.

2. Description of the Prior Art

Polyethylene terephthalate resins have excellent properties, such as mechanical properties, chemical resistance, electrical properties and heat resistance, and are widely utilized for electrical insulating materials, automobile parts and the like. These properties of polyethylene terephthalate resins can be improved by the addition of various additives, such as a fiber reinforcement, e.g. glass fiber or carbon fiber, a function-imparting agent, e.g. flame retarder, and the like, and thus, the use of polyethylene terephthalate resins has increasingly been broadened.

Polyethylene terephthalate resins belong to crystalline resins and are characterized in that their properties largely depend upon the crystallinity thereof. Therefore, it is necessary to highten their crystallinity in order to improve the dimensional stability and deflection temperature thereof. Thus, there has been proposed various means for accelerating the crystallization of polyethylene terephthalate resins. For example, there have been proposed a method in which a molded article obtained in a partially crystallized state is subjected to post-heat treatment to further the crystallization process and a method in which such a molded article is dipped into a liquid capable of enhancing the crystallinity. However, these methods undesirably necessitate some post-treatments and have a further drawback in that the molded article may be deformed upon the post-treatment.

Further, there has been known a method in which, in order to accelerate the crystallization of a resin at the time of the fabrication, the molten resin is injected into a mold heated to a high temperature and then hardened within the mold. In this method, the use of a heating medium is necessary to maintain the mold at a high temperature, which is undesirable from the point of view of safety in the molding operation, and further, a long molding cycle time is required.

Recently, nucleating agents have been used for shortening the molding cycle time. Although such a method can afford a high crystallinity in a fairly short period of time, there is still room for improvement. For example, even in the case where a nucleating agent is added to a polyethylene terephthalate resin, it is necessary to use a mold of a high temperature, such as 130° to 140° C. In British Pat. No. 2,015,014, it is described that the use of a crystal growing agent in combination with a crystal nucleating agent can successfully lower the mold temperature to a fair extent. However, this method also leaves room for improvement in that the proposed crystal growing agent used is necessary in a fairly large amount and, thus, the properties inherent to the polyethylene terephthalate resin may deleteriously be affected.

SUMMARY OF THE INVENTION

It has now been found that the incorporation of specific amounts of dimethyl terephthalate or diethyl terephthalate and a specific metal salt of a carboxylic acid or a specific ionic copolymer into a polyethylene terephthalate resin can advantageously attain the successful molding of an article in a mold of a temperature of 85° to 110° C. and, thereby, provide a molded article of an excellent dimensional stability and thermal resistance.

Thus, it is the primary object of the present invention to provide a polyethylene terephthalate resin composition capable of providing a molded article of excellent properties by molding it at a mold temperature of 85° to 110° C.

The above and other objects, which will become apparent from the description hereinbelow, can be attained by a polyethylene terephthalate resin composition according to the present invention, which comprises: (A) a polyethylene terephthalate resin having an intrinsic viscosity of 0.35 to 0.9 as measured in orthochlorophenol at 35° C., and per 100 parts by weight of the polyethylene terephthalate resin; (B) 5 to 200 parts by weight of an inorganic filler; (C) 0.1 to 20 parts by weight of dimethyl terephthalate or diethyl terephthalate; and (D) 0.01 to 5 parts by weight of a salt of a carboxylic acid with a metal of Group I or II in the periodic table or 0.1 to 10 parts by weight of an ionic copolymer of an α-olefin with a salt of an $\alpha,\beta$-unsaturated carboxylic acid and containing an ion of a metal of Group I or II in the periodic table.

DESCRIPTION OF PREFERRED EMBODIMENTS

The polyethylene terephthalate resin usable as component (A) includes polyethylene terephthalates obtainable using as the acid component terephthalic acid or an ester-forming derivative thereof and as the glycol component ethylene glycol or an ester-forming derivative thereof. However, polyethylene terephthalates obtained by replacing a portion of the terephthalic acid component or ethylene glycol component by a copolymerizable component may also be useful. Examples of such a copolymerizable component includes aromatic dicarboxylic acids such as isophthalic acid, phthalic acid, alkyl-substituted phthalic acids, e.g. methylterephthalic acid and methylisophthalic acid, naphthalenedicarboxylic acids, e.g. naphthalene-2,6-dicarboxylic acid, naphthalene-2,7-dicarboxylic acid and naphthalene-1,5-dicarboxylic acid, and diphenoxyethane dicarboxylic acids, e.g. 4,4'-diphenoxyethanedicarboxylic acid; aliphatic and alicyclic dicarboxylic acids such as succinic acid, adipic acid, sebacic acid, azelaic acid, decadicarboxylic acid and cyclohexanedicarboxylic acid; aliphatic and alicyclic diols such as trimethylene glycol, tetramethylene glycol, hexamethylene glycol, neopentyl glycol, diethylene glycol, 1,4-cyclohexanedimethanol; dihydroxybenzenes such as hydroquinone and resorcinol; bisphenols such as 2,2-bis(4-hydroxydiphenyl)-propane and 2,2-bis(4-hydroxydiphenyl)-sulfone; aromatic diols such as ether diols obtainable from bisphenols and glycols such as ethylene glycol; and, hydroxycarboxylic acids such as ε-hydroxycaproic acid, hydroxybenzoic acid and hydroxyethoxybenzoic acid. These copolymerizable components may be employed alone or as a mixture of two or more thereof. Preferably, they are employed in an amount of not more than 20 mol% of the total amount of the carboxylic acid (hydroxycarboxylic acids should be calculated as a half thereof being the carboxylic acid).

The polyethylene terephthalates may have a branched chain copolymerized with a small proportion of a trifunctional or tetrafunctional ester-forming compounds, such as tricarballylic acid, trimesic acid or trimellitic acid. The polyesters may be employed alone or as a mixture of two or more thereof.

The polyethylene terephthalate resin usable for the present invention should have an intrinsic viscosity of 0.35 to 0.9, preferably 0.45 to 0.8, as measured at 35° C. using ortho-chlorophenol as a solvent. The use of a polyethylene terephthalate resin of an intrinsic viscosity less than 0.35 provides a molded article of a low strength. If the intrinsic viscosity is more than 0.9, the resulting articles may have a low lustrous surface appearance due to the low flowability of the resin composition and further have unstable mechanical and thermal properties.

The inorganic filler (B) usable for the present invention includes fibrous reinforcements such as glass fiber, asbestos, carbon fiber and potassium titanate fiber, and inorganic fillers, such as mica, silica, talc, calcium carbonate, glas bead, glass flakes, clay and wollastonite, in a powder, granular or plate form.

The dimethyl or diethyl terephthalate usable for the (C) component acts as desired, in the present invention, in combination with the carboxylic acid salt or ionic copolymer as (D) component. The terephthalate should be added in an amount of 0.1 to 20 parts by weight, preferably 0.5 to 10 parts by weight, per 100 parts by weight of the polyethylene terephthalate resin. If the amount of the terephthalate added is less than 0.1 parts by weight, a substantial effect to accelerate the crystallization may not be attained. In the case where the terephthalate is added in an amount of more than 20 parts by weight, the effect to accelerate the crystallization may not be increased and the resulting molded article may have a low strength.

The carboxylic acid salt usable for the (D) component is selected from carboxylic acid salts of metals of Groups I and II in the periodic table and there may be exemplified such metal salts of aliphatic monocarboxylic acids such as acetic acid, propionic acid, caproic acid, palmitic acid, stearic acid, oleic acid, behenic acid, montanic acid, methacrylic acid and acrylic acid, of aliphatic dicarboxylic acids such as oxalic acid, adipic acid, succinic acid, sebacic acid, maleic acid and fumaric acid, and of aromatic carboxylic acids such as benzoic acid, terephthalic acid and phthalic acid. Suitable metals are sodium, potassium, lithium, magnesium, calcium, zinc and the like. These carboxylic acid salts need no always be neutralized in all the carboxyl groups, but a part of the carboxyl groups may be in a salt form and the remaining groups may be in a free acid or ester form.

(D) component may preferably be an ionic copolymer of an α-olefin with an α,β-unsaturated carboxylic acid salt and containing an ion of a metal of Group I or II in the periodic table. Such ionic copolymers may be prepared by a known method as described, for example, in U.S. Pat. Nos. 3,639,527, 3,264,272, 3,338,739 and 3,404,134.

Examples of the ionic copolymer are those polymers having the units of the following structural formula,

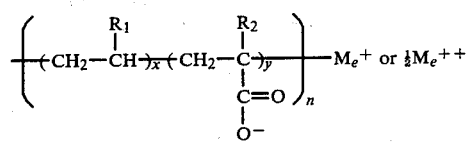

in which $R_1$ is hydrogen, alkyl of 1 to 12 carbon atoms or phenyl, $R_2$ is hydrogen, methyl or ethyl, $M_e$ is a metal atom of Group I or II in the periodic table, x and y are each independently an integer of 1 to 100, and n is an integer of 10 to 10,000.

Ionic copolymers of an α-olefin and an α,β-unsaturated dicarboxylic acid salt, for example, of ethylene and a salt of maleic acid or itaconic acid, and containing a Group I or II metal ion may also be used.

Other examples of the ionic copolymer are ionic graft copolymers obtained, for example, by grafting an α,β-unsaturated carboxylic acid ester to a polyolefin, saponifying the graft polymer and then reacting it with an alkali metal hydroxide.

The above-mentioned ionic copolymers should preferably have an olefin content of at least 50% by weight. Copolymers having an olefin content of 80 to 99% by weight may especially be suitable.

Further examples of the ionic copolymer are those copolymers having the following units (a), (b) and (c),

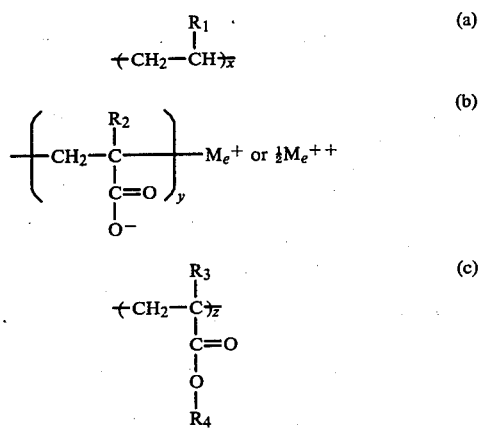

in which $R_1$, $R_2$ and $M_e$ are as defined above, $R_3$ is hydrogen, methyl or ethyl, $R_4$ is hydrogen or alkyl of 1 to 12 carbon atoms, and x, y and z are each independently an integer of 1 to 100. These ionic copolymers should preferably have an olefin content of at least 50% by weight, with those having an olefin content of 80 to 90% by weight being especially preferable. Preferably, the total content of the ester component ((c)) and the ionic component ((b)) may be at least 10% by weight and the content of the ionic component ((b)) may be at least 3% of the weight of the ionic copolymer. All the carboxyl groups of the ionic copolymer need not always be neutralized, but at least 10% of the carboxyl groups should be neutralized by metal ions.

Especially preferable metal ions are alkali metal ions, particularly the sodium ion. Especially preferable ionic copolymers are those of ethylene and methacrylic acid and containing an alkali metal ion, particularly the sodium ion.

The above-mentioned carboxylic acid salt of (D) component should be added in an amount of 0.01 to 5 parts by weight, preferably 0.05 to 3 parts by weight, per 100 parts by weight of the polyethylene terephthalate resin. In the case where the amount is less than 0.01 parts by weight, a substantial effect to accelerate the crystallization may not be attained. If the amount is more than 5 parts by weight, the effect to accelerate the crystallization may not be increased and the resulting molded article may have a low strength. The ionic copolymer should be added in an amount of 0.1 to 10 parts by weight per 100 parts by weight of the polyethylene terephthalate resin. If the amount is less than 0.1 parts by weight a substantial effect to accelerate the crystallization may not be attained, while if the amount is more than 10 parts by weight the effect to accelerate the crystallization may not be increased.

The polyethylene terephthalate resin composition may further have various additives incorporated for improving the other properties. For example, there may be incorporated as a flame retardant a halogen-containing compound such as a decabromobiphenyl ether, octabromobiphenyl ether, halogenated polycarbonate oligomer (e.g., polycarbonate oligomer obtained from brominated bisphenol A) or halogenated epoxy compound, a phosphorus compound such as red phosphorus or triphenyl phosphate, a phosphorus-nitrogen compound such as phosphonic acid amide, or a flame-retarding auxiliary such as antimony trioxide or zinc borate. Further, the resin composition may contain, for the purpose of improving the thermal resistance, an antioxidant or heat stabilizer such as a hindered phenol compound, organic phosphorus compound or sulfur compound. Furthermore, an epoxy compound may be added to the resin composition for improving the melt viscosity stability, hydrolytic resistance or the like. As examples of such an epoxy compound, there may be mentioned a bisphenol A type epoxy compound obtained by the reaction of bisphenol A with epichlorohydrin, an aliphatic glycidyl ether obtained by the reaction of a glycol or glycerol with epichlorohydrin, a novolak type epoxy compound obtained by the reaction of a novolak resin with epichlorohydrin, an aromatic or aliphatic carboxylic acid type epoxy compound and an alicyclic compound type epoxy compound obtained from an alicyclic compound, preferably a bisphenol A type epoxy compound and a diglycidyl ether of a low-molecular-weight polyethylene glycol. Other additives, such as ultraviolet absorbers, colorants, lubricants and foaming agents, may also be added as desired.

Furthermore, there may be added a small amount of another thermoplastic resin such as a styrene resin, acrylic resin, polyethylene, polypropylene, fluoroplastic resin, polyamide resin, polycarbonate resin or polysulfone; a thermosetting resin such as a phenolic resin, melamine resin, unsaturated polyester resin or silicone resin; or a soft thermoplastic resin such as an ethylene-vinyl acetate copolymer or polyester elastomer.

The polyethylene terephthalate resin composition according to the present invention may be prepared by any conventional blending methods. The respective components should preferably be uniformly distributed throughout the composition. Preferably, the components may be homogeneously blended by feeding them all together or separately into a mixing machine such as a blender, kneader, roll, extruder or the like. In general, the components may previously be dry mixed, the mixture than may be melt blended in a heated extruder and extruded into a wire shape, and finally, the extruded thread may be cut into a granular form of a desired length. The so obtained molding composition is usually maintained in a dry state and then submitted to molding. Alternatively, the (B) and (D) components may be added to the (A) component, before, during or after the polycondensation, in the course of the production of the polyethylene terephthalate resin. Thereafter, the (C) component may be added.

The polyethylene terephthalate resin composition according to the present invention can provide a molded article of a very high crystallinity that can be molded at a temperature of a broad range, and can provide a molded article of a high excellence in dimensional stability. The polyethylene terephthalate resin composition has advantageously a high flowability, as measured in an injection molding machine having a spiral mold.

The invention will further be illustrated by the following examples, in which the properties of the products were measured as follows.

(1) Deflection Temperature

This was measured according to the method of ASTM D648 under a load of 264 psi.

(2) Static Strength

Tensile strength was measured according to the method of ASTM D638, and flexural strength and modulus were determined according to the method of ASTM D790.

(3) Shrinkage Factor

Injection molding was carried out using a mold having an inner dimension of 110 mm×110 mm×2 mm, and the molding shrinkage factor and the heat shrinkage factor were calculated by the following equations:

$$\text{Molding shrinkage factor (\%)} = \frac{110 - (\text{molded article size in mm})}{110} \times 100$$

$$\text{Heat shrinkage factor (\%)} = \frac{(\text{molded article size in mm}) - (\text{heat-treated article size in mm})}{(\text{molded article size in mm})} \times 100$$

The above-mentioned molded article size is the size of a molded article after standing at 25° C. for 48 hours. The heat-treated article size is one of a molded article after being annealed at 130° C. for 2 hours and then allowed to stand at 25° C. for 48 hours.

EXAMPLES 1–3 AND COMPARISON EXAMPLES 1–8

A polyethylene terephthalate resin having an intrinsic viscosity of 0.64 was dried at 130° C. for 5 hours and uniformly mixed with the additives as shown in Table 1 below, in the given proportions, in a V-type mixer. The mixture was melt blended in an extruder of a diameter of 68 mm at a barrel temperature of 270° C. and formed into pellets by cooling and cutting the thread extruded from the die.

The pellets were then hot-air dried at 130° C. for 5 hours and injection molded into test pieces of desired shapes at a cylinder temperature of 270° C. and a mold temperature of 85° C., under an injection pressure of 800 kg/cm². The cooling time was 20 seconds and the cycle was completed over a period of 35 seconds.

The obtained results are also shown in Table 1.

TABLE 1

| Example No. | (A) Polyethylene terephthalate | (B) Glass fiber | (B) Talc | (C) DMT* | (C) DET** | (D) Na stearate | (D) Na benzoate | (D) Na montanate*** | Deflection temperature (°C.) | Molding shrinkage (%) | Heat shrinkage (%) | Surface appearance**** | Tensile strength (kg/cm²) | Flexural strength (kg/cm²) |
|---|---|---|---|---|---|---|---|---|---|---|---|---|---|---|
| Comparison 1 | 100 | — | — | — | — | — | — | — | 70 | 0.4 | 1.6 | x | 600 | 1000 |
| Comparison 2 | 70 | 30 | — | — | — | — | — | — | 72 | 0.5 | 1.6 | x | 1500 | 2100 |
| Comparison 3 | 69.7 | 30 | — | — | — | — | — | 0.3 | 74 | 0.5 | 1.6 | x | 1500 | 2100 |
| Comparison 4 | 69.9 | 30 | — | — | — | 0.1 | — | — | 74 | 0.5 | 1.6 | x | 1500 | 2100 |
| Comparison 5 | 69.9 | 30 | — | — | — | — | 0.1 | — | 74 | 0.5 | 1.6 | x | 1500 | 2100 |
| Comparison 6 | 67 | 30 | — | 3 | — | — | — | — | 73 | 0.5 | 1.6 | x | 1500 | 2100 |
| Comparison 7 | 67 | 30 | — | — | 3 | — | — | — | 74 | 0.5 | 1.6 | x | 1500 | 2100 |
| Comparison 8 | 48.9 | 30 | — | — | 21 | 0.1 | — | — | 215 | 1.2 | 0.14 | o | 1200 | 1900 |
| 1 | 66.9 | 30 | — | 3 | — | 0.1 | — | — | 212 | 1.3 | 0.13 | o | 1500 | 2100 |
| 2 | 71.9 | 25 | — | — | 3 | 0.1 | — | — | 211 | 1.3 | 0.13 | o | 1500 | 2100 |
| 3 | 63.9 | 20 | 15 | — | 1 | — | 0.1 | — | 200 | 1.4 | 0.12 | o | 1200 | 1500 |

*DMT: Dimethyl terephthalate
**DET: Diethyl terephthalate
***Na montanate is based on a partial salt of a mixture of aliphatic carboxylic acids of 22 to 32 carbon atoms.
****X: Flow pattern is observed. o: Flow pattern is not observed.

It is apparent from Table 1 that the absence of either the (C) component or the (D) component provides a molded article of a low crystallinity and an inferior surface appearance. On the contrary, a molded article having both the (C) component and the (D) component incorporated therein in combination has a high crystallinity, a high deflection temperature, a low shrinkage factor, and a good surface appearance.

EXAMPLES 4-9 AND COMPARISON EXAMPLES 9-11

The procedure as described above was repeated using a polyethylene terephthalate resin (A) having an intrinsic viscosity of 0.65, and an inorganic filler (B), a crystal growing agent (C) and a crystal nucleating agent (D) as shown in Table 2 below.

The obtained results are also shown in the table.

EXAMPLES 10-12 AND COMPARISON EXAMPLES 12-15

Pellets of polyethylene terephthalate having an intrinsic viscosity of 0.64 and dried at 130° C. for 5 hours were uniformly mixed, in a V-type mixer, with glass chopped strands of a length of 3 mm, dimethyl terephthalate or diethyl terephthalate and an ionic copolymer as shown in Table 3, in given proportions. The mixture was melt blended in an extruder of a diameter of 65 mm at a barrel temperature of 280° C. and formed into pellets by cooling and cutting the thread extruded from the die. The pellets were then hot-air dried at 130° C. for 5 hours and injection molded into test pieces on an injection molding machine of a capacity of 5 ounces provided with a mold for test pieces, under the conditions of a cylinder temperature of 270° C., a mold temperature of 85° C., an injection pressure of 800 kg/cm², a cooling time of 20 seconds and a cycle time of 35 seconds. The properties of the thus obtained articles are also shown in Table 3 below.

The ionic copolymer used in these examples was a copolymer of 90 parts by weight of ethylene and 10 parts by weight of methacrylic acid in which the carboxyl groups were neutralized by sodium ions. The melt

TABLE 2

| Example No. | (A) Polyethylene telephthalate | (B) Glass fiber | (B) Talc | (C) DMT* | (C) DET** | (D) Na stearate | (D) Na benzoate | (D) Na montanate*** | Deflection temperature (°C.) | Molding shrinkage (%) | Heat shrinkage (%) | Surface appearance**** | Tensile strength (kg/cm²) | Flexural strength (kg/cm²) |
|---|---|---|---|---|---|---|---|---|---|---|---|---|---|---|
| Comparison 9 | 79.85 | 20 | — | 0.05 | — | 0.1 | — | — | 85 | 0.8 | 1.5 | x | 1200 | 1500 |
| Comparison 10 | 69.85 | 30 | — | — | 0.05 | 0.1 | — | — | 83 | 0.8 | 1.5 | x | 1500 | 2100 |
| Comparison 11 | 61 | 30 | — | — | 3 | 6 | — | — | 215 | 1.0 | 0.11 | o | 1300 | 2000 |
| 4 | 62.9 | 35 | — | 2 | — | — | 0.1 | — | 213 | 1.3 | 0.12 | o | 1550 | 2200 |
| 5 | 66.7 | 30 | — | 3 | — | — | 0.3 | — | 220 | 1.4 | 0.10 | o | 1500 | 2100 |
| 6 | 63.9 | 30 | — | — | 6 | — | 0.1 | — | 225 | 1.5 | 0.10 | o | 1400 | 2000 |
| 7 | 68.9 | 10 | 20 | — | 1 | 0.1 | — | — | 200 | 1.4 | 0.12 | o | 1100 | 1400 |
| 8 | 66.7 | 30 | — | — | 3 | — | — | 0.3 | 220 | 1.4 | 0.10 | o | 1500 | 2100 |
| 9 | 71.9 | 25 | — | — | 3 | 0.1 | — | — | 215 | 1.3 | 0.12 | o | 1400 | 2000 |

*, , *, ****: DMT, DET, Na montanate and surface appearance are as defined in Table 1 above.

It is apparent from Table 2 that the (C) component of less than 1 part by weight can not provide a high crystallinity and the (D) component of more than 5 parts by weight causes a lowering of strength. However, the molded articles of a composition falling within the scope of the present invention have a high crystallinity and a good surface appearance.

index of this copolymer was no more than 0.1 g/10 min. according to the method of ASTM D1238-57T and the grain size was 300 to 500μ.

TABLE 3

| | Composition (parts by weight) | | | | | Properties of molded article | | | | | |
|---|---|---|---|---|---|---|---|---|---|---|---|
| | (A) component Polyethylene terephthalate | (B) component Glass fiber | (C) component DMT* | (C) component DET** | (D) component Ionic copolymer | Deflection temperature (°C.) | Molding shrinkage (%) | Heat shrinkage (%) | **** Surface appearance | Tensile strength (kg/cm²) | Flexural strength (kg/cm²) |
| Example No. | | | | | | | | | | | |
| Comparison 12 | 100 | — | — | — | — | 70 | 0.4 | 1.6 | x | 600 | 1000 |
| Comparison 13 | 70 | 30 | — | — | — | 72 | 0.5 | 1.6 | x | 1500 | 2100 |
| Comparison 14 | 66 | 30 | — | — | 4 | 70 | 0.4 | 1.6 | o | 1400 | 1900 |
| Comparison 15 | 67 | 30 | 3 | — | — | 73 | 0.5 | 1.6 | x | 1500 | 2100 |
| 10 | 66 | 30 | 2 | — | 2 | 211 | 1.3 | 0.13 | o | 1400 | 2000 |
| 11 | 62 | 30 | — | 4 | 4 | 207 | 1.3 | 0.13 | o | 1500 | 2000 |
| 12 | 63 | 30 | 1 | 2 | 4 | 208 | 1.2 | 0.12 | o | 1500 | 2000 |

*, , **: DMT, DET and surface appearance are as defined in Table 1.

It is apparent from Table 3 that the absence of either the (C) component or the (D) component provides a molded article of a low crystallinity, while the incorporation of the (C) component and the (D) component in combination according to the invention affords a molded article of a high crystallinity, a high deflection temperature, a low shrinkage factor, and a good surface appearance.

EXAMPLE 13

100 parts by weight of polyethylene terephthalate pellets of an intrinsic viscosity of 0.72, dried at 140° C. for 4 hours, 42 parts by weight of glass chopped strands 3 mm long and 3 parts by weight of diethyl terephthalate were uniformly mixed in a tumbling barrel and the mixture was formed into pellets in the same manner as in Example 10. The thus obtained pellets were hot-air dried at 140° C. for 3 hours and then uniformly mixed with 5 parts by weight, per 100 parts by weight of the pellets, of an ionic copolymer (grain size of about 500μ) of a high-pressure polyethylene grafted with 6 mol% of acrylic acid and neutralized by sodium hydroxide. The mixture was then subjected to injection molding under the same conditions as in Example 10. The thus obtained article had a lustrous, excellent surface appearance as well as the following properties.

| | |
|---|---|
| Deflection temperature: | 206° C. |
| Molding shrinkage factor: | 1.3% |
| Heat shrinkage factor: | 0.13% |
| Tensile strength: | 1,300 kg/cm² |
| Flexural strength: | 1,900 kg/cm² |
| Flexural modulus: | 88,000 kg/cm² |

EXAMPLE 14

64 parts by weight of polyethylene terephthalate pellets of an intrinsic viscosity of 0.64, dried at 130° C. for 5 hours, 10 parts by weight of glas chopped strands 3 mm long, 20 parts by weight of talc (Talcum Powder PKN, sold by Hayashi Kasei Co., Ltd., Japan), 1 part by weight of dimethyl terephthalate and 5 parts by weight of an ionic copolymer as used in Example 10 were mixed and formed into pellets in the same manner as described in Example 10. Then, the pellets were molded into an article as in Example 10. The thus obtained article had a lustrous, excellent surface appearance as well as the following properties.

| | |
|---|---|
| Deflection temperature: | 200° C. |
| Molding shrinkage factor: | 0.8% |
| Heat shrinkage factor: | 0.1% |
| Tensile strength: | 1,100 kg/cm² |
| Flexural strength: | 1,400 kg/cm² |

We claim:

1. A polyethylene terephthalate resin composition consisting essentially of (A) a polyethylene terephthalate resin having an intrinsic viscosity of 0.35 to 0.9 as measured in ortho-chlorophenol at 35° C. and, per 100 parts by weight of the polyethylene terephthalate resin, (B) 5 to 200 parts by weight of an inorganic filler, (C) 0.1 to 20 parts by weight of dimethyl terephthalate or diethyl terephthalate and (D) 0.01 to 5 parts by weight of a salt of a carboxylic acid with a metal of Group I or II in the periodic table or 0.1 to 10 parts by weight of an ionic copolymer of an α-olefin with a salt of an α,β-unsaturated carboxylic acid and containing an ion of a metal of Group I or II in the periodic table.

2. A composition as claimed in claim 1, wherein the (B) component is selected from glass fiber, asbestos, carbon fiber, potassium titanate fiber, mica, silica, talc, calcium carbonate, glass bead, glass flakes, clay and wollastonite.

3. A composition as claimed in claim 1, wherein the (C) component is continued in an amount of 0.5 to 10 parts by weight per 100 parts by weight of the polyethylene terephthalate resin.

4. A compound as claimed in claim 1, wherein the (D) component is selected from salts of carboxylic acids with metals of Groups I and II in the periodic table.

5. A composition as claimed in claim 4, wherein the (D) component is selected from salts of metals of Groups I and II in the periodic table with aliphatic monocarboxylic acids, aliphatic monocarboxylic acids, and aromatic carboxylic acids.

6. A composition as claimed in claim 5, wherein the aliphatic monocarboxylic acid is selected from acetic acid, propionic acid, caproic acid, palmitic acid, stearic acid, oleic acid, behenic acid, montanic acid, methacrylic acid and acrylic acid.

7. A composition as claimed in claim 5, wherein the aliphatic dicarboxylic acid is selected from oxalic acid, adipic acid, succinic acid, sebacic acid, maleic acid and fumaric acid.

8. A composition as claimed in claim 5, wherein the aromatic carboxylic acid is selected from benzoic acid, terephathalic acid and phthalic acid.

9. A composition as claimed in claim 4, wherein the (D) component is contained in an amount of 0.05 to 3 parts by weight per 100 parts by weight of the polyethylene terephthalate resin.

10. A composition as claim in claim 1, wherein the (D) component is selected from ionic copolymers of an α-olefin with an α,β-unsaturated carboxylic acid salt and containing an ion of a metal of Groups I or II in the periodic table.

11. A composition as claimed in claim 10, wherein ionic copolymer is selected from those having the units of the following structural formula,

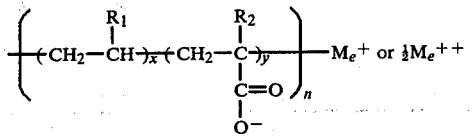

in which $R_1$ is hydrogen, alkyl of 1 to 12 carbon atoms or phenyl, $R_2$ is hydrogen, methyl or ethyl, $M_e$ is a metal atom of Group I or II in the periodic table, x and y are each independently an integer of 1 to 100, and n is an integer of 10 to 10,000.

12. A composition as claimed in claim 10, wherein the ionic copolymer is selected from those of an α-olefin and an α,β-unsaturated dicarboxylic acid salt.

13. A composition as claimed in claim 10, wherein the ionic copolymer is selected from those having an α,β- unsaturated carboxylic acid ester chain grafted and then reacted with an alkali metal hydroxide.

14. A composition as claimed in claim 10, wherein the ionic copolymer is selected from those having the following units (a), (b) and (c),

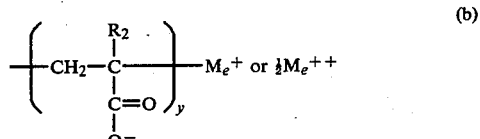

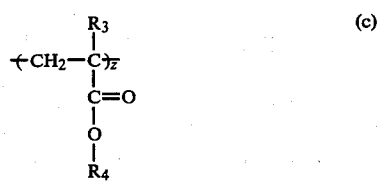

in which $R_1$, $R_2$ and $M_e$ are as defined in claim 9, $R_3$ is hydrogen, methyl or ethyl, $R_4$ is hydrogen or alkyl of 1 to 12 carbon atoms, and x, y and z are each independently an integer of 1 to 100.

* * * * *